United States Patent [19]

Yazawa, deceased et al.

[11] 4,411,722

[45] Oct. 25, 1983

[54] METHOD FOR PRODUCING A NON-WOVEN FABRIC OF CROSS-LAMINATED WARP AND WEFT WEBS OF ELONGATED STOCKS

[75] Inventors: Masahide Yazawa, deceased, late of Tokyo, Japan; by Hiroshi Yazawa, executor, Kunitachishi; Kazuhiko Kurihara, Tokyo, Japan; Hiroshi Yazawa, Kunitachishi, Japan; Yuki Kuroiwa, Tokyo, Japan; Shuichi Murakami, Itabashi, Japan

[73] Assignee: Polymer Processing Research Institute Ltd., Osaka, Japan

[21] Appl. No.: 279,839

[22] Filed: Jul. 2, 1981

Related U.S. Application Data

[63] Continuation-in-part of Ser. No. 134,507, Mar. 27, 1980, abandoned, which is a continuation of Ser. No. 767,198, Feb. 9, 1977, abandoned, which is a continuation of Ser. No. 527,920, Nov., 1974, abandoned.

[30] Foreign Application Priority Data

Nov. 29, 1973 [JP] Japan ............................. 48-134525

[51] Int. Cl.³ ............................................. B32B 31/00
[52] U.S. Cl. .................................. 156/167; 156/177; 156/265; 156/271; 156/309.6; 428/114
[58] Field of Search ............... 156/167, 181, 178, 62.4, 156/177, 500, 74, 155, 436, 441, 181, 265, 266, 290, 291, 309.6; 65/9; 264/167; 428/105, 114, 113, 295, 198

[56] References Cited

U.S. PATENT DOCUMENTS

| | | | |
|---|---|---|---|
| 2,797,728 | 7/1957 | Slayton et al. | 156/181 |
| 2,902,395 | 9/1959 | Hirschy | 428/255 |
| 3,095,338 | 6/1963 | Romanin | 156/441 |
| 3,123,512 | 3/1964 | Mercer | 156/441 |
| 3,308,220 | 3/1967 | Smith | 264/167 |
| 3,357,807 | 12/1967 | Stalego | 156/62 X |
| 3,723,218 | 3/1973 | Gaffney | 156/167 |
| 3,855,036 | 12/1974 | Solbeck | 156/181 |
| 4,052,243 | 10/1977 | Yazawa et al. | 156/266 |
| 4,211,807 | 7/1980 | Yazawa et al. | 156/178 |

FOREIGN PATENT DOCUMENTS 522816 7/1957 Italy ................................ 156/178

Primary Examiner—Michael W. Ball
Attorney, Agent, or Firm—Fred Philpitt

[57] ABSTRACT

A process for producing a non-woven fabric of cross-laminated warp web and weft webs is provided, which comprises first preparing the weft webs by ejecting a molten polymer of specified properties through orifices provided on the peripheral surface of a rotating vessel, in the lateral direction of the vessel and toward elongated stocks arranged in parallel and in cylindrical form and running around the vessel vertically in the direction of the polymer ejection; causing the ejected polymer to form adhesive filaments adhered onto the stocks to thereby fix the arrangement of the stocks; cutting open the resulting web and cutting the cut-open web by a length corresponding to a width of the above cross-laminated product; successively placing the cut webs onto the above warp web without gaps; and melting the adhesive filaments constituting the weft webs by heating the laminate to thereby bond the cross-points of the weft webs and the warp web to obtain the above product.

This product has a precise lattice arrangement and can be simply and cheaply produced and used for various uses.

8 Claims, 10 Drawing Figures

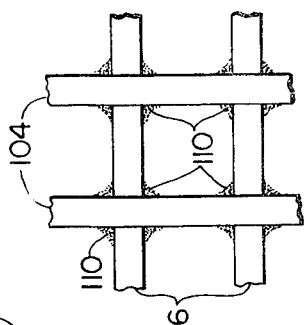
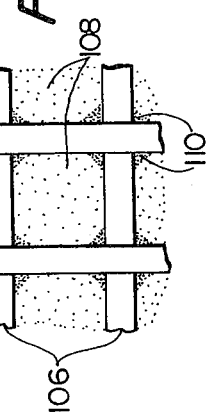
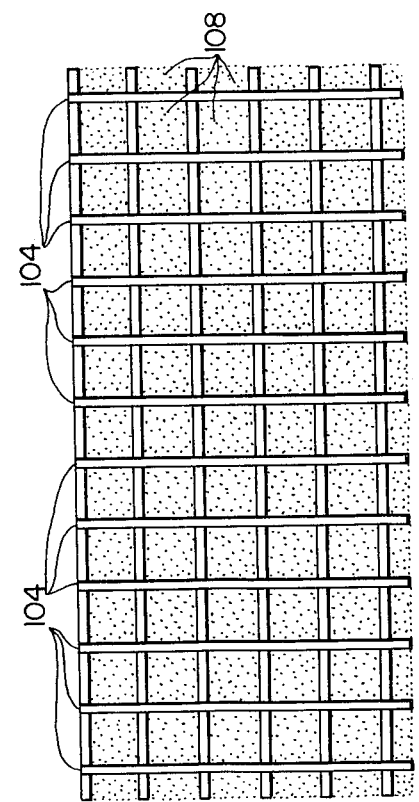
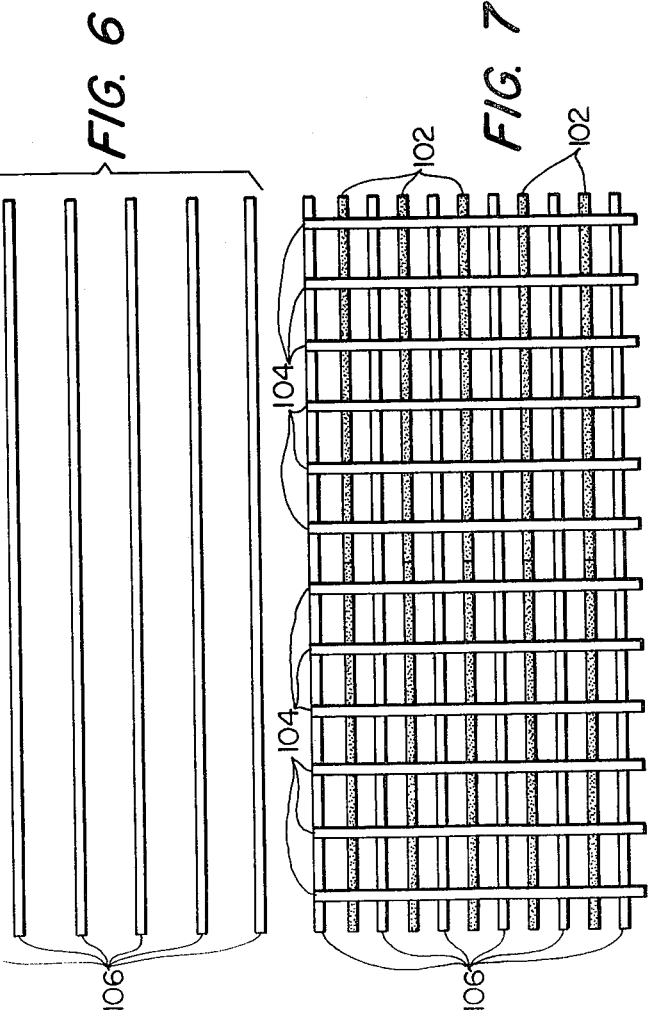
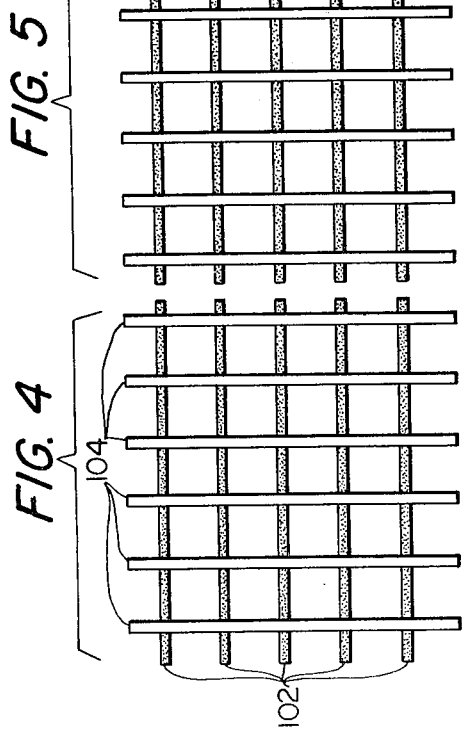

METHOD FOR PRODUCING A NON-WOVEN FABRIC OF CROSS-LAMINATED WARP AND WEFT WEBS OF ELONGATED STOCKS

This application is a continuation-in-part of application Ser. No. 134,507 filed Mar. 27, 1980 which, in turn, is a continuation application Ser. No. 767,198 filed Feb. 9, 1977 which, in turn, is a continuation of application Ser. No. 527,920 filed Nov. 27, 1974, all now abandoned.

BACKGROUND OF THE INVENTION

1. Field of the Invention

This invention relates to a process for producing a non-woven fabric of cross-laminated warp web and weft webs. More particularly it relates to a process for producing the same wherein the weft webs are first prepared by ejecting a polymer in molten state, having a lower melting point than running elongated stocks described below and having a good affinity thereto, through orifices provided on the peripheral surface of a rotating vessel in the lateral direction of the vessel and toward elongated stocks arranged in parallel and in cylindrical form and running around the vessel vertically in the ejection direction of the polymer; causing the ejected polymer to form adhesive filaments adhered onto the elongated stocks to thereby fix the arrangement of the stocks; cutting open the resulting web and cutting the cut-open web by a length corresponding to a width of the above cross-laminated product; successively placing the cut webs onto the above warp web without gaps; and melting the adhesive filaments constituting the weft webs by heating the laminate to thereby bond the cross-points of the weft webs and the warp web to obtain the above cross-laminated product of precise lattice arrangement.

2. Description of the Prior Art

A process for producing non-woven fabrics comprising randomly arranged fibers, for example, mats or packs, according to a process for producing centrifugal candy-fluff-like fibers i.e. a process of centrifugally ejecting a polymer liquid from a number of small holes on the outer peripheral surface of a vessel rotating at a high velocity, solidifying the ejected material into random fibers and collecting these fibers to obtain a mat, has so far been disclosed (Japanese patent publication No. 6784/1974—Matsuda et al).

U.S. Pat. No. 3,357,807 to Stalego issued Dec. 12, 1967 discloses a process for producing mats, fibrous packs, etc. from glass fibers or other heat-softenable filaments ejected according to the above centrifugal process.

U.S. Pat. No. 3,723,218 to Gaffney, issued Mar. 27, 1973 discloses a process for producing a plastic net by intermittently preparing a doughnut-like material from a polymer liquid, dropping this material onto a rotating plate, and adhering it to a cylindrically and vertically arranged fibrous material prepared in advance, through a centrifugal force due to the rotation.

In any of the above prior art, the ejected glass or polymer forms a fibrous material from which a final product in the form of mats, packs or nets is obtained. In the present invention, however, the polymer to be ejected is an adhesive polymer, and the ejected polymer in the form of filament melts at the step of producing a lattice-form product comprising laminated warp and weft webs and loses the filament form, resulting in playing a role of fixing cross-points of the warp and weft webs together at the lamination step, and again playing an important role as an adhesive in the case where papers, films, fleece or the like are intended to be reinforced by the aimed lattice-form, laminated product.

Further, the greatest difficulty in the production of the lattice-form laminate resided in that when the weft webs was laminated on the warp web, the arrangement of the weft filaments (elongated stocks) forming the weft webs was notably disturbed; hence no orderly and regularly arranged lattice-form product has been obtained. It has become possible to obtain an orderly and regularly arranged lattice form product for the first time since it has become possible to fix the arrangement of the weft elongated stocks with the adhesive filaments according to the present invention. Furthermore, the adhesive polymer used in the present invention has a melting point lower than that of the elongated stocks in a cylindrical form, and in particular, a good affinity to the latter, and when the resulting web to constitute the above weft webs is wound into a roll of 5,000 to 6,000 m, it is necessary that the polymer has properties to cause no blocking. Thus, the ejected filaments in the present invention constitute adhesive polymer filaments fulfilling the above-mentioned conditions; hence such adhesive polymer filaments are not simple polymer filaments which directly constitute a product as seen in the above prior art.

As described above, the above various prior art and similar prior art have neither disclosed nor suggested such an inventive idea as in the present invention that by fixing the arrangement of elongated stocks by adhesive filaments, a success in producing the product of the present invention having a precisely arranged lattice-form structure has been brought about, and further such adhesive filaments melt by heating at the time of laminating the warp and weft webs to fix the cross-points of the warp and weft webs.

SUMMARY OF THE INVENTION

The present invention resides in a method for producing a non-woven fabric of cross-laminated warp web and weft webs of elongated stocks, comprising two steps. The first step is directed to a method for producing a non-woven web comprising:

ejecting continuous streams of an adhesive polymer liquid which is a molten polymer or a concentrated dope of a polymer, in the form of a number of filaments, toward the inside surfaces of a number of elongated stocks arranged in parallel, vertically and in a cylindrical form and running while holding definite pitches between each other, through orifices regularly arranged on the outer peripheral surface of a high speed rotating vessel of a discus shape provided at the central part of the above cylindrical form, in a manner which is similar to that of the centrifugal candy-fluff making process but different therefrom in that the above orifices are numerable and regularly arranged;

thus causing the adhesive polymer liquid thus ejected and forming filaments still having a sufficient adhering ability, successively and in parallel arrangement, to adhere onto the elongated stocks in the lateral direction thereof;

thereby fixing the arrangement of the stocks to form a web in which the arrangement of the stocks is fixed by the filaments of the adhesive polymer liquid after solidified as a connecting material in multiple stages and in the lateral direction of the stocks;

cutting open and flattening the resulting web; and
continuously withdrawing the cut open and flattened web.

The second step of the method of the present invention is directed to a method for continuously producing a non-woven fabric of cross-laminated warp web and weft webs of elongated stocks, as a final product, comprising:

cutting the flattened web obtained in the first step, into weft webs by every length corresponding to the width of a running warp web separately prepared by arranging a number of elongated stocks into warp;

overlaying the resulting weft webs successively on the above running warp crosswise thereto and without leaving any gaps between the adjoining weft webs placed side by side; and bringing the adhesive polymer filaments attached to the stocks of the weft webs, into a liquid or softened state and redistributing them, by heating, to thereby bond the weft webs onto the warp web by means of the adhesive polymer after solidified and fix the arrangement of the both.

BRIEF DESCRIPTION OF THE DRAWINGS

FIGS. 4–10 are a series of sequential sketches showing the way in which webs, filaments and elongated stocks are positioned and assembled and joined.

DETAILED DESCRIPTION OF THE INVENTION

Figure 1:
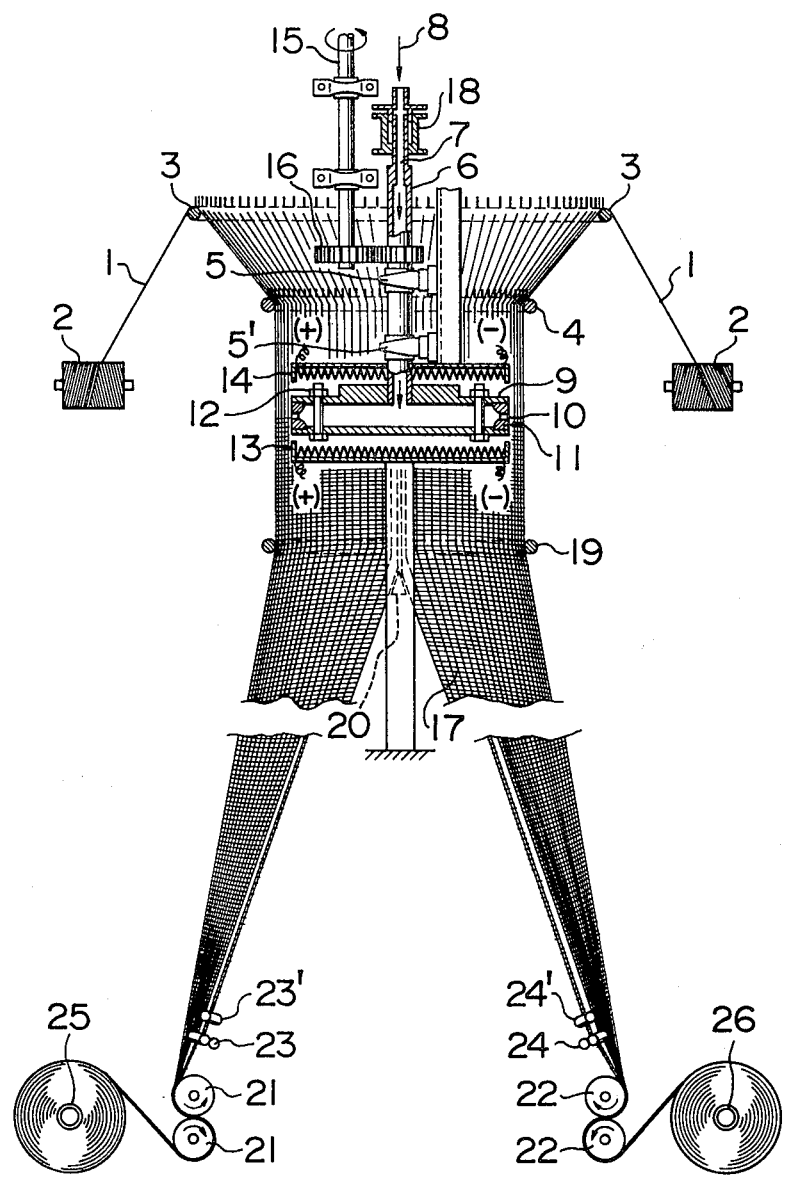
FIG. 1 is a schematic view illustrating an embodiment of the first step of the method of the present invention.

The stocks referred to in the present invention are mutually independent linear stocks of inorganic or organic origins, such as filament yarns, spun yarns, monofilaments, stretched tapes (flat yarns) and split yarns of reticulated structure.

As for the adhesive polymers used as raw material of the ejected filaments, a hot melt type adhesive mainly comprising ethylene-vinyl acetate copolymer may be used for elongated stock of glass, polyethylene, cellulose, etc. Besides, polyvinyl alcohol dope may be used for heat-treated polyvinyl alcohol fiber or acetalized polyvinyl alcohol fiber or glass fiber; and fiber grade polymer such as polyolefin, nylon or polyester mixed with amorphous polymer thereof may be used for their respective fibers.

For preparing a web of random fiber arrangement, a centrifugal candy-fluff-like fiber web manufacturing process has been well known, which process comprises ejecting streams of a polymer liquid radially from a number of small orifices provided on the outer peripheral surface of a high speed-rotating vessel by centrifugal force, solidifying the polymer liquid into a fibrous form and, after cutting or without cutting, gathering the resulting solidified polymer fibers is well known. Many processes for producing a non-woven fabric from webs of random fiber arrangement prepared by said process have been heretofore proposed, but according to the first step of the present invention, streams of an adhesive polymer liquid in a state of filaments ejected radially in a manner similar to the candy-fluff-making process is made to get to the inner surface of a running elongated stock layer in a cylindrical arrangement across a certain distance between the stocks and orifices while the ejected continuous streams of the above polymer liquid still has a sufficient adhering ability, and the above polymer liquid adheres successively in parallel arrangement onto the inner surface of the running elongated stock layer, and thereby connects the arranged elongated stocks in the lateral direction one another by means of parallel filaments of the ejected adhesive polymer liquid in multiple stages forming a lattice structure of warps and wefts after solidified, whereby arrangement of the elongated stocks is fixed into a web, and the web is then cut open, flattened and withdrawn. The flattened web prepared according to the first step of the present invention, i.e. by connecting elongated stocks running in the longitudinal direction as warps by a number of ejected filaments in the lateral direction as wefts, and thereby fixing the arrangement of the elongated stocks, constitutes a novel non-woven web quite different from the conventional ones not only in the structure but also in the physical properties resulting therefrom.

The above-mentioned web is used as a weft web in producing the fabric of cross-laminated warp web and weft webs of the elongated stocks according to the second step of the present invention which is based on the prior invention developed by the present applicant (U.S. Pat. No. 3,859,156, issued Jan. 7, 1975). That is, the cross-laminated fabric of lattice structure having a precise stock arrangement can be obtained with a high efficiency by cutting the web prepared as weft web as above, by a length corresponding to the width of a warp web feeding the cut pieces of the weft web cross-wise over the running warp web successively, and overlaying them one by one onto the warp web without any disorder of elongated stocks of the wefts, because a number of the elongated stocks in the weft have been fixed in the lateral direction by the ejected filaments of the adhesive polymer, while being arranged in a cylindrical form and holding definite distances between each other. After the cross-overlaying, the resulting whole is moved over a heating drum to another successively, whereby the ejected filaments of the adhesive polymer are heated and the liquefied adhesive polymer is redistributed on the warp and weft stocks and the warp and weft stocks are stably bonded and fixed to each other after solidification of the adhesive polymer, at cross points of the warp and weft stocks. That is, there are no fibrous residues of the ejected adhesive polymer left on the laminate of warp and weft stocks, and a cross-laminate of the warp and weft stocks in a lattice of warp and weft structure can be characteristically obtained in the present invention.

When a cross-laminated fabric is prepared by laminating the yarns as warps and wefts according to the second step of the present invention, the ejected filaments serve to fix the mutual distances of the yarns in the webs before cross-lamination, and after lamination of the warps and wefts, the ejected filaments are softened or melted by heating, redistributed and solidified on the yarns, whereby the ejected filaments serve as an adhesive to effect adhesion of the warps and wefts at their intersections, and also effect adhesion of the resulting laminated fabric to other material, for example, paper, film, fleece, etc. Therefore, a polymer having a lower melting point than that of the yarns, which can serve fully as adhesives, is used.

In the second step of the present invention, it is an absolute condition that the softening point or melting point of the ejected filaments should be lower than that of the elongated stocks, and it is a necessary condition that, even if the ejected filaments are melted, the elongated stocks must not be deteriorated, namely, must not be melted or lose their tenacity by relaxation of molecular orientation. For example, ejected filaments of a copolymer of ethylene and vinyl acetate having a lower melting point than that of high density polyethylene, or hot melt-type adhesive polymer blend of the copolymer further compounded with paraffin and adhesiveness-increasing agents such as modified natural resin and having a further lowered melting point can be used as a polymer liquid for connecting the elongated stocks composed of stretched tapes or monofilament of high density polyethylene arranged in parallel one another in the lateral direction. In this case, the ejected filaments as the adhesive are melted or softened by heating after cross-overlaying of the weft webs upon the warp web, whereby the ejected filaments can be melted or softened without causing any heat deterioration of the high density polyethylene elongated stocks, and can gather on the stocks. Arrangement of warps and wefts are firmly fixed at intersections of the stocks and a cross-laminated fabric of lattice structure of high density polyethylene elongated stocks can be obtained. In the case of polymers difficult in melting, for example, polyvinyl alcohol, polyacrylonitrile, polyvinyl chloride, etc., an appropriate solvent is used to prepare a concentrated polymer dope, and the resulting concentrated polymer dope is used as the polymer liquid for the ejected filaments.

When polyvinyl alcohol elongated stocks are heat-treated after stretching, resistance thereof to hot water is remarkably improved, and therefore when a highly concentrated solution of polyvinyl alcohol, for example, a solution having a concentration of 30 to 50%, is ejected from a high speed rotating vessel in a heated state at 100° C. to the elongated stocks or vinylon elongated stocks, viz, polyvinyl alcohol elongated stocks stretched and acetalized after heat treatment, the ejected filaments are rich in the adhesive property to the stocks, and can sufficiently connect the elongated stocks arranged in parallel one another in the lateral direction. When the ejected filaments, even though dried up, are exposed to steam at 100° C. without heat treatment, the ejected filaments are immediately softened or further melted, whereas the heat-treated and acetalized elongated stocks do not undergo deterioration by such heating. Thus, the ejected polyvinyl alcohol filaments are suitable as an adhesive polymer for a cross-laminated fabric of warps and wefts of acetalized polyvinyl alcohol stocks. Furthermore, the ejected polyvinyl alcohol filaments are well melted or softened with steam, and have highly adhesive property and are resistant up to more than 200° C. when dry-heated, and therefore the ejected polyvinyl alcohol filaments are often used in the production of a crosslaminated fabric of warps and wefts of glass fiber stocks, nylon or polyester stocks. In order to increase the adhesiveness of the ejected filaments, another certain polymer which is compatible with a polymer having a high fiber-forming property as the first polymer component, and also has a highly adhesive property can be sometimes mixed with the latter polymer. For example, amorphous polypropylene is often mixed with polypropylene of fiber-grade; low density polyethylene is often with high density polyethylene; and amorphous copolymer of polyamide or polyester is often mixed with polyamide or polyester of fiber grade, respectively. Also, in the case of nylon or polyester elongated stocks, adhesive polymers having a high affinity to these stocks and also having a low melting point are well known, and the polymer of ejected filaments can be redistributed after brought into liquid in the same manner as in the case of polyethylene elongated stocks, and a cross-laminated fabric of warps and wefts can be prepared.

In the first step of the present invention, the ejected filaments may be sometimes adhered to the stocks in a weight more than that of the stocks arranged in the cylindrical form, depending upon the desired object of the first step product, but in the second step of the present invention, 15 to 30% by weight of the ejected filaments as the adhesive, on the weight basis of the elongated stocks of the cross-laminated fabric, can attain the desired purpose in many cases.

Distance or pitch of one elongated stock to another arranged in a cylindrical form is generally not more than 10 mm, and more frequently 1.5 to 5 mm, and when the pitch is smaller, stocks having a small thickness, for example, 200 to 300 deniers are used. With increase in the pitch, stocks having a thickness of 500 to about 1,000 deniers are used. For example, a number of polyethylene flat yarns having a width of 7 mm and a thickness of 1,000 deniers are made to run longitudinally in parallel at a pitch of 10 mm, forming a cylinder and directing their flat surfaces toward the center of the cylinder, and a hot melt-type adhesive polymer consisting mainly of copolymer of ethylene and vinyl acetate is used for ejected filaments of 25 deniers adhering to the yarns at a pitch of 1 mm in parallel in the lateral direction according to the first step of the present invention. In that case, 25% by weight of the adhesive based on that of the yarns is adhered thereto. The yarns, whose arrangement is thus fixed by the ejected filaments of the adhesive can be used as a weft web at least in preparing a cross-laminated fabric of warps and wefts. This procedure is one of the second step of the present invention. The yarns thus fixed by ejected filaments of an adhesive polymer can be used not only for the weft web alone, but also for both weft and warp webs for cross-lamination.

A distance between the outer peripheral wall of the rotating vessel and the layer of cylindrically arranged yarns can be experimentally determined in view of the following conditions. That is to say, if the thickness of the ejected filaments in denier is larger, the resulting centrifugal force may be larger, and the air resistance of the ejected filaments may be smaller, as compared with the case where the thickness in denier is smaller. Thus, a larger distance can be employed. For example, if the ejected filaments have a thickness of 20 to 30 deniers, the distance may be 50 to 100 mm.

If a suction is applied to the ejected filaments by providing a negative pressure chamber surrounding the outer side of the layer of cylindrically arranged yarns, though not shown in the drawing, both centrifugal force and suction force are applied to the ejected filaments, and the ejected filaments can get to the layer of cylindrically arranged yarns more quickly. That is, the ejected filaments having a smaller thickness in denier can get to the layer of cylindrically arranged yarns within such a period of time that the adhesive ability is still retained on the surfaces of the ejected filaments.

The utilization of the product of the present invention will be described below in brief.

In the case where the product obtained according to the first step of the process of the present invention, i.e. a web obtained by adhering the hot-melt adhesive material as weft adhesive filaments onto warp elongated stocks, is utilized as an adhesive web, such an adhesive web is less in the weight per unit area of the web and cheaper than film-like hot-melt adhesives, and adhesion in parts is effected to make possible an air-permeable and water-permeable adhesion, and further, its processability is superior since it is provided with warp yarns. Furthermore, when it is laminated onto papers, films or the like and the resulting laminate is longitudinally cut off into tapes, these tapes are very suitable as a flexible, hot-melt adhesive tape used in place of sewing machines or as an adhesive tape for braids or insulating tape for electric wires, etc., as compared with hot-melt adhesive films. This web is also used as a web or warp yarns alone, which reinforces papers, non-woven clothes, etc. in the longitudinal direction.

The final product obtained according to the second step of the present invention can be used for reinforcing glass wool mats, papers, non-woven fabrics, foamed sheets, synthetic leathers, aluminum foils, etc. Further it can be also used as a substrate cloth for asphalt processings in roofing, water-proof works, etc. or as a substrate cloth for synthetic resin sheets. Furthermore, when the product of the present invention is made from glass fibers or carbon fibers, the resulting product can be used as a substrate cloth for FRTS or ERTP. Still further, the product of the present invention can be used as a substitute cloth for victorian lawn, canvas, muslin, etc.

Further, products of the present invention can also be used as agricultural shading net, insect-proof net, carpet backing, reinforcement of sheet materials such as paper, film, fleece, boards of cement, gypsum or asphalt, etc.

Now, the present invention will be described in details by way of the accompanying drawings:

In FIG. 1, a desired number of yarns 1 are withdrawn from bobbins 2 and guided into a cylindrical arrangement at predetermined pitches through circular combs 3 and 4 provided at two successive stages under almost equal tensions established by passing yarn 1 through a tension-adjusting means (not shown in the drawing). The yarn in the cylindrical form may be run in the horizontal direction, but generally in the vertical direction, for example, yarns may be advanced downwards or upwards. In FIG. 1, the yarns are made to run downwards. Polymer liquid 8 is quantitively supplied from the top into a circular vessel 9 fixed at the down end of central shaft 6, which is supported by bearings 5 and 5' at the center of cylindrically arranged yarns and is rotatable at a high speed, through a central hole 7 bored through central shaft 6, usually by means of a pump (not shown in the drawing).

Vessel 9 has a diameter smaller than that of the cylindrically arranged elongated stocks keeping definite distance therebetween and is composed of ring 11 having a number of small orifices 10 on its periphery and upper and lower circular plates. The ring is liquidtightly fixed between two upper and lower circular plates of the vessel by tightening bolts 12, and when the orifices of the ring are clogged with foreign matters, the ring can be freely replaced. Since the rotating vessel requires heating and thermal insulation in many cases, electrically heating chambers 13 and 14 are provided for covering the lower side and upper side, respectively, of the vessel, so as not only to prevent the rotating vessel from cooling but also to prevent any disturbance of the ejected filaments caused by air turbulence generated along the upper and lower wall surfaces of the vessel, through the high speed rotation thereof.

Figure 2:
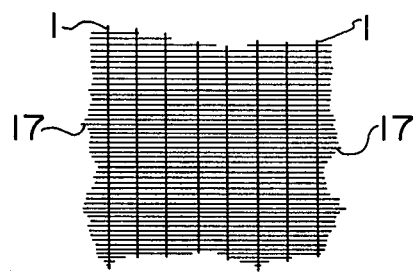
FIG. 2 is a partially enlarged view of a web prepared according to the first step of the method of the present invention.

The vessel is rotated at a high speed by a driving shaft 15, for example, through engaging gears 16. The polymer liquid supplied into the vessel is ejected radially from the vessel in the form of slender or fine streams through a number of small orifices 10 by a centrifugal force corresponding to the outer peripheral speed of ring 11 coming up to more than 1,000 m/min to get to connect cylindrically arranged yarns 1 one another in parallel to the lateral direction of the stocks by ejected filaments 17 after solidified, shown in an enlarged scale in FIG. 2.

Sealing device 18 based on a mechanical sealing or on a stuffing box containing packing is provided between the stationary feed pipe of the polymer liquid and the bored high speed rotary shaft, and a solvent for the polymer is injected into the sealing device to prevent the polymer liquid from its permeation into a slide-rubbing part in the sealing device. For example, when a molten copolymer of ethylene and vinyl acetate is used as a polymer liquid, liquefied paraffin is injected into sealing device. Even if paraffin is leaked into the polymer liquid, only a small amount of paraffin is mixed with the polymer liquid without causing any actual damage against adhesive property of the polymer liquid. When a concentrated polyvinyl alcohol solution is used as the polymer liquid, saturated steam is supplied to the slide-rubbing part, and the polymer liquid is slightly diluted with its drain without causing any actual damage. To the contrary when the polymer liquid permeates into the slide-rubbing part, the polymer is coagulated and deteriorated in many cases, causing a trouble to the rotation of the shaft.

In FIG. 1, the cylindrical web, whose yarn arrangement is fixed by the ejected filaments, is successively cut into two semi-circular sheets by means of two cutters 20 provided at symmetrical positions in the directions perpendicular to the drawing, on the periphery of a ring 19 provided below, and these two semi-circular sheets are withdrawn at equal speeds to left and right directions separately as shown in the drawing by means of pinch rollers 21 and 22. When the sheets are provided by cloth guiders 23, 23', 24 and 24' before pinch rollers, the semi-circular webs are flattened, and are wound up onto winding cores 25 and 26, respectively. When the cylindrically arranged yarns are cut at one point on the periphery thereof, and opened into a flat sheet by a cloth guider at each side edge while guiding the sheet by means of bent rollers, one flat web can be obtained. When the yarns are withdrawn from bobbins on a creel means via tension-adjusting means and pulled by pinch rollers 21 and 22 provided in a position down to the cutting-open and flattening region, the cloth guiders in said flattening work well, and the flattening of the web whose yarn arrangement is fixed by the ejected filaments in the lateral direction, can be readily carried out.

Figure 3:
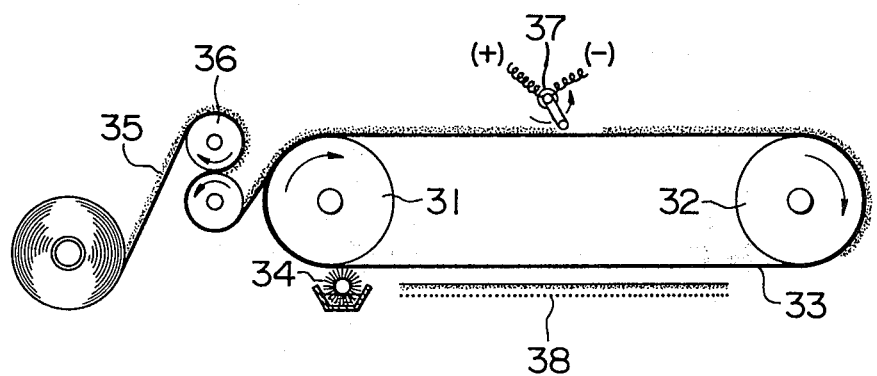
FIG. 3 is a schematic view illustrating the second step of the method of the present invention where the web obtained in the first step is cut and the resulting webs are overlaid as weft webs on a warp web to form a non-woven fabric of cross-laminated warp web and weft webs, as a final product.

In FIG. 3, the web obtained by means of the apparatus of FIG. 1 is used as a weft web in the second step of the present invention, where the weft web is conveyed over the warp web by a water-wetted lattice belt of the warp-weft laminator according to the method of U.S. Pat. No. 3,859,156 presented by the present applicant.

Horizontally circulating lattice belt 33, driven by rotating sprocket wheels 31 and 32, is wetted by brush 34 rotating half-immersingly in a water tank in the downside circulating passage thereof, and weft web 35 prepared by means of the apparatus of FIG. 1 and having the stock arrangement fixed by ejected filaments of adhesive polymer, is supplied onto the lattice belt through pinch rollers 36, while making the pasted side upside, and cut by a melt cutter 37 by a length corresponding to the width of the warp web continuously running below the lattice belt and crosswise to the feed direction of the weft web, while being moved horizontally. The cut weft web is conveyed over the running warp web in the downside circulating passage, and when the cut weft web is entirely overlapped upon the warp web, a number of linear edges (not shown in the drawing) are projected downwards through the openings between individual lattices of the lattice belt, whereby the weft webs adhered onto the lattice surface by the surface tension of water are made to fall upon warp web 38 intermittently and repeatedly and cross-overlaid upon the warp web one by one. At that time, the filaments of the adhesive polymer of the weft webs are interposed between the weft web and the warp web, and the resulting cross-overlaid is passed over a hot drum (not shown in the drawing) in the course progressing in the direction perpendicular to the drawing, whereby the filaments of the adhesive polymer are softened or melted by heating, and redistributed and solidified on the weft and warp yarns. The intersections of the weft and warp stocks are thus fixed by adhesive polymer.

FIGS. 4–10 are provided to further illustrate the method of this invention. FIGS. 4 and 5 show two square sections of weft web that have been produced by ejecting adhesive filaments 102 perpendicularly to an array of elongated stocks 104 to thereby form a weft web by fixing the elongated stocks 104 in a parallel relationship to each other. This cylindrical weft web is split and cut into the two squares shown in FIGS. 4 and 5. A warp web of parallel elongated stocks 106 is then provided, as shown in FIG. 6. The two squares of weft web shown in FIGS. 4 and 5 are then overlaid on the warp web of FIG. 6 to provide the arrangement shown in FIG. 7, and it will be seen that (a) the warp yarn 106 and the weft yarn 104 cross one another at essentially right angles and (b) the adhesive filaments 102 are parallel to the warp yarn 106. This overlay arrangement is then moved over a heating drum whereupon the adhesive filaments 102 melt and the melted adhesive polymer 108 will run over the surface of the heated drum and between the filaments 106 and 104 as shown in FIG. 8. Since the liquified adhesive 108 is present over the entire surface of the drum, this means that the adhesive will be present at the cross-over points of the warp and weft yarns, as is indicated by 110 in FIG. 9. When the overlaid warp and weft webs are removed from the heated drum, the adhesive 110 at the cross-over points will solidify and hold the warp and weft webs in a fixed spatial relationship to each other, as is shown in FIG. 10.

EXAMPLE 1

Glass fiber yarns having 600 deniers (individual single filament, 9 microns in diameter and 40 twists per meter of yarn) were withdrawn vertically downwards at a pitch of 5 mm through a circular comb having a peripheral length of 2 m by pinch rollers at 40 m/min. A polymer composed mainly of a copolymer of 80% ethylene and 20% vinyl acetate was extruded as an adhesive from an extruder having a diameter of 50 mm, and supplied into a vessel having a diameter of 500 mm at 140° C., which rotated at 1,600 rpm. Twenty five small orifices having each a diameter of 1.0 mm were provided on the outer peripheral wall of the vessel, and the polymer is ejected radially through the orifices, in the form of continuous filaments, and adhered to the yarn layer, 75 mm apart from the vessel. The thickness of the filaments of the adhesive polymer was 28 deniers, and the ejected filaments adhered to the cylindrically arranged yarns in parallel in a slightly slanted state, but approximately perpendicularly to the arranged yarns at a pitch of 1 mm. The cylindrically arranged yarns were cut at two symmetrical points at the periphery by melting the filaments, and two semi-circular sheets were flattened by cloth guiders provided before pinch rollers at both left and right selvages, and withdrawn, whereby two webs having each a width of 1 m with a number of ejected filaments connecting the yarns laterally were obtained. The thus obtained webs were used as raw material webs for warps and wefts in a process for overlaying the warps and wefts as shown in FIG. 3, and passed over a heating drum after overlaying to remelt the ejected filaments, and an arrangement of the warps and wefts was fixed by bonding. A glass fiber cross-laminated fabric having a good yarn arrangement was obtained. As a measure of the adhesion strength, a tensile strength in a direction of 45° to the crossed yarns of the product was measured, and it was 1.2 kg per 5 cm width.

EXAMPLE 2

240 polyethylene flat yarns having a width of 7 mm and 1,000 deniers thick and arranged in a cylindrical form, were run vertically downwards, each at a pitch of 10 mm, through the apparatus as shown in FIG. 1, while directing the flat surfaces of the individual yarns to the center of the cylindrical form. A hot melt-type adhesive having a melting point of 90° C., consisting mainly of a copolymer of ethylene and vinyl acetate, compounded with small amounts of paraffin and modified natural resin was supplied to a rotating vessel by a gear pump. A distance between the outer periphery of the vessel and the cylindrically arranged flat yarn layer was made to be 70 mm, and the ejected filaments having a thickness of 25 deniers were adhered in parallel to the yarn layer in the lateral direction, each at a pitch of 1 mm, and cut into two semi-circular sheets. Two flat yarn webs with the ejected filaments thereon having a width of 1.2 m each were withdrawn towards both left and right directions separately at a speed of 40 m/min. The flat yarn webs were used as warp and weft webs and cross-overlaid, while directing the ejected filament sides of both warp and weft webs to downside. After the overlaying, the whole was advanced over heating drums from one to another to melt the ejected filaments, and fix the warps and wefts. A cross-laminated flat yarn fabric was thus obtained. The resulting laminated fabric could be not only used directly as packaging cloth, but also used as a packaging paper mentioned below, that is to say, paper of 70 g/m² was laid upon the pasted side, and bonded thereto by heating, whereby packaging paper having a remarkably high tearing strength could be obtained.

What is claimed is:

1. In the method for producing a non-woven fabric of cross-laminated warp web as a web in the machine direction and weft webs as webs in the lateral direction thereto, said warp web and said weft webs both comprising parallel elongated stocks and being bonded only at the crossing points of said parallel elongated stocks of said warp web and said weft webs, and said weft webs being produced by applying laterally to cylindrically arranged and longitudinally running, preformed, elongated stocks, a number of filaments ejected radially through the orifices furnished on the outer periphery of a rotating vessel wherein a raw material to form said filaments is contained in molten state, provided at the central part of said running stocks, and cutting open the resulting tubular material, the improvement which comprises:

(a) employing as said material to form said ejected filaments, an adhesive polymer having both a good affinity for said running stocks and a lower melting point than that of said running stocks;

(b) applying said ejected filaments onto said running stocks in a state where the filaments still have adhesiveness for said running stocks, such application of the ejected filaments being in parallel arrangement and in multiple stages, to thereby fix the arrangement of said running stocks in the lateral direction thereof by means of said filaments themselves;

(c) cutting the resulting weft web into a series of lengths, each length corresponding to the width of the cross-laminated product to be produced;

(d) successively placing said cut weft webs onto said warp web without any gaps therebetween in such a manner that the parallel elongated stocks of said warp web and the parallel elongated stocks of said weft webs cross each other in an overlying relationship, and (e) applying heat to said overlying warp and weft webs while guiding the overlay onto a heated drum to thereby pass over the drum, melt said adhesive filaments, and permit the melted adhesive to redistribute on said warp and weft webs at their crossing points, thus obtaining a cross-laminated product having a precise lattice arrangement.

2. A method according to claim 1 wherein said adhesive polymer is composed of a copolymer of ethylene and vinyl acetate, paraffin and an adhesiveness-increasing agent.

3. A method according to claim 1 wherein said adhesive polymer is a polyvinyl alcohol dope.

4. A method according to claim 1 wherein said adhesive polymer is composed of a fiber grade polyolefin and an amorphous polymer of the olefin of said polyolefin.

5. In the method for producing a cross-laminated non-woven fabric composed of a warp web and weft webs in a crossed relationship to each other, said warp and weft webs both comprising parallel elongated stocks and being bonded together at only the crossing points of said warp and weft webs, said weft webs being produced by applying laterally to cylindrically arranged and longitudinally running preformed elongated stocks, a number of filaments ejected radially by centrifugal force through orifices located on the outer periphery of a reservoir provided centrally of said running stocks and rotating at a high speed, in which reservoir a raw material to form said filaments is contained in a molten state, and cutting open the resulting tubular material, the improvement which comprises:

(a) employing as said raw material to form said ejected filaments, a polymer which is adhesive when heated and which has a good affinity for both the said running stocks and the elongated stocks of the warp web, and also has a lower melting point than those of said running stocks and the stocks of warp web;

(b) applying said ejected adhesive filaments onto said running stocks in a state where the filaments still have adhesiveness to said running stocks, such application of the ejected adhesive filaments being in essentially parallel relationship and in multiple stages, to thereby fix the arrangement of said running stocks in the lateral direction thereof by means of said filaments themselves;

(c) cutting the weft web resulting from step (b) into a series of separate weft webs, each of which has a length corresponding to the width of the cross-laminated product to be produced;

(d) successively placing said cut weft webs onto said warp web without any gaps therebetween and in such a manner that the parallel elongated stocks of said warp web and the parallel elongated stocks of said weft webs cross each other in an overlaying relationship, (e) applying heat to said overlaid warp and weft webs while guiding the overlay onto a heated drum to thereby melt said adhesive filaments and permit the melted adhesive to spread over the drum surface and come into contact with said warp and weft webs at their crossing points, and (f) removing said overlay from said heated drum so as to allow the adhesive on said overlay to solidify and thereby establish a cross-laminated product having a precise lattice arrangement.

6. A method according to claim 5 wherein said adhesive polymer is composed of a copolymer of ethylene and vinyl acetate, paraffin and an adhesiveness-increasing agent.

7. A method according to claim 5 wherein said adhesive polymer is a polyvinyl alcohol dope.

8. A method according to claim 5 wherein said adhesive polymer is composed of a fiber grade polyolefin and an amorphous polymer of the olefin of said polyolefin.

* * * * *